United States Patent [19]

Denner et al.

[11] 4,328,607
[45] May 11, 1982

[54] MANUFACTURING PROCESS FOR FOIL MAGNETIC RECORDING DISKS

[75] Inventors: Horst B. W. Denner; Armin R. Tietze, both of San Jose, Calif.

[73] Assignee: International Business Machines Corporation, Armonk, N.Y.

[21] Appl. No.: 102,161

[22] Filed: Dec. 10, 1979

[51] Int. Cl.³ .................... B29D 17/00; B23P 11/02
[52] U.S. Cl. .................................. 29/169.5; 29/448
[58] Field of Search .............. 29/446, 448, 449, 169.5; 52/222; 360/99, 97, 135; 228/110, 141.1, 265; 414/3

[56] References Cited

U.S. PATENT DOCUMENTS

| | | | |
|---|---|---|---|
| 3,359,549 | 12/1967 | Farrand et al. | 360/97 |
| 3,365,079 | 1/1968 | Mauguen | 29/449 X |
| 3,373,413 | 3/1968 | Treseder | 360/99 |
| 3,480,964 | 11/1969 | Siler | 360/135 |
| 3,537,083 | 10/1970 | Vath | 360/99 |
| 3,599,226 | 8/1971 | Lips | 360/135 |

Primary Examiner—Charlie T. Moon
Attorney, Agent, or Firm—Walter J. Madden, Jr.

[57] ABSTRACT

A magnetic recording device employing a thin foil member is fabricated by radially compressing a ring member, securing the periphery of the foil member to the compressed ring, releasing the compression on the ring so that it expands to produce tension in the foil member.

A magnetic coating may be applied to the foil member either before or after securing it to the ring member.

4 Claims, 3 Drawing Figures

MANUFACTURING PROCESS FOR FOIL MAGNETIC RECORDING DISKS

DESCRIPTION

1. Technical Field

This invention relates in general to magnetic recording disks, and relates more particularly to processes for magnetic disks in the form of a foil.

2. Background Art

In magnetic recording, the use of disks having either particulate or thin film magnetic coatings thereon is well known. Each of these types of coatings has problems associated therewith which render them less than totally desirable, particularly for extremely thin coatings which are required for the high bit density recording patterns being used now and in the future.

Particulate coatings on aluminum substrates, especially in extremely thin layers, often exhibit limited durability with respect to contact with the magnetic transducer associated with the disk. Thin film disks, usually produced by sputtering, evaporation or electroplating of a magnetic coating, generally provide magnetic coatings which are thinner than those available with particulate coatings. However, thin film disks often exhibit significant corrosion problems, primarily because of the reaction between the metal substrate, which has been required to be aluminum because of weight considerations, and the deposited thin film layer, and have required the deposition of protective layers between the substrate and the thin film layer and over the thin film layer. Understandably, the requirement for these protective layers has added significantly to the cost of the thin film disk.

Additionally, both particulate and thin film disks usually have employed a substrate of substantial thickness relative to the coating thickness, thereby adding appreciably to the weight of an assembly which includes several of such disks.

Recording disks of the foil type have been proposed in the past for magnetic recording. Usually such disks have been formed of a plastic substrate coated with magnetic material and arranged to provide some type of compliant surface for interacting with the magnetic transducer.

3. Prior Art

U.S. Pat. No. 3,373,413 (Treseder), discloses a magnetic recording disk in which a plastic foil member is stretched over a mounting ring by the application of force to its outer edge and is then clamped to the ring to produce a compliant recording surface.

U.S. Pat. No. 3,599,226, (Lips) discloses a magnetic recording device formed of two spaced foil members arranged so that air may flow between the foils as they rotate to urge the foil surfaces against their associated recording heads.

U.S. Pat. No. 3,537,083 (Voth) shows a magnetic recording device employing a flexible disk mounted on a base having a cavity therein to permit controlled air pressure to be applied to the disk for varying its tension.

U.S. Pat. No. 3,480,964 (Siler) discloses a magnetic recording device in which the disks are secured to an enclosure by means of a hardenable material inserted into grooves extending around the disks.

U.S. Pat. No. 3,359,549 (Farrand et al) shows a magnetic recording device employing thin metal or plastic disks which are tensioned and supported at their periphery and to which access is had by transducers mounted in the central openings of the disks.

THE INVENTION

In accordance with the present invention, a magnetic recording foil is formed of a thin, corrosion resistant metallic material either being magnetic in nature or having a coating of magnetic material on one or both surfaces. This magnetic coating may be either particulate such as disclosed in U.S. Pat. No. 3,058,844, or thin film. The foil is formed by securing its outer edge around the circumference of a ring member which is radially compressed. After securing the edge of the foil member to the compressed ring, the compression of the ring is released to allow the ring to expand radially. This expansion produces tension in the attached foil member to produce a recording surface which is not subject to rippling, bending or other undesirable effects sometimes associated with foil recording disks.

In one embodiment of the invention, a foil is mounted on a ring in the above manner and is provided with one surface for magnetic recording. Alternatively, both foil surfaces may have magnetic recording material applied thereto. In another embodiment, two foil members are provided with each ring, one attached to the upper surface of the ring and the other to the lower surface. Both sides of each foil are provided with magnetic recording coatings and by providing a central opening in each foil for an access mechanism carrying one or more magnetic transducers, access may be had to information recorded on any of the four recording surfaces of the two foils. Alternatively, only the upper surface of one foil and the lower surface of the other foil is provided with a magnetic coating, and access to these two recording surfaces is had by transducers movable from the outside diameter of the disk toward the inside diameter.

Recording devices constructed in accordance with this invention provide a number of advantages over other types of magnetic recording devices. By use of thin film magnetic coatings, extremely high bit densities are obtainable, yet the problems of corrosion are eliminated by the use of a corrosion-resistant material for the foil material and by the fact that no corrosion-prone metal substrate is required. Further, because of the thin foils used, the resulting structure is extremely light, even when a number of such foil/ring members are used in a recording assembly, and the recording disk is very durable because of its hardness and the flexibility of the foil. Additionally, devices of the present invention are lower in cost than particulate or thin film disks on aluminum substrates because there is no requirement for expensive grinding or diamond turning of a substrate, and no need for the application of protective corrosion-resistant coatings. A further factor which reduces the cost of the present devices is the ability to fabricate the recording members of this invention, including application of the magnetic coating, in a continuous process.

DESCRIPTION OF THE BEST MODE
and
INDUSTRIAL APPLICABILITY

Figure 1:
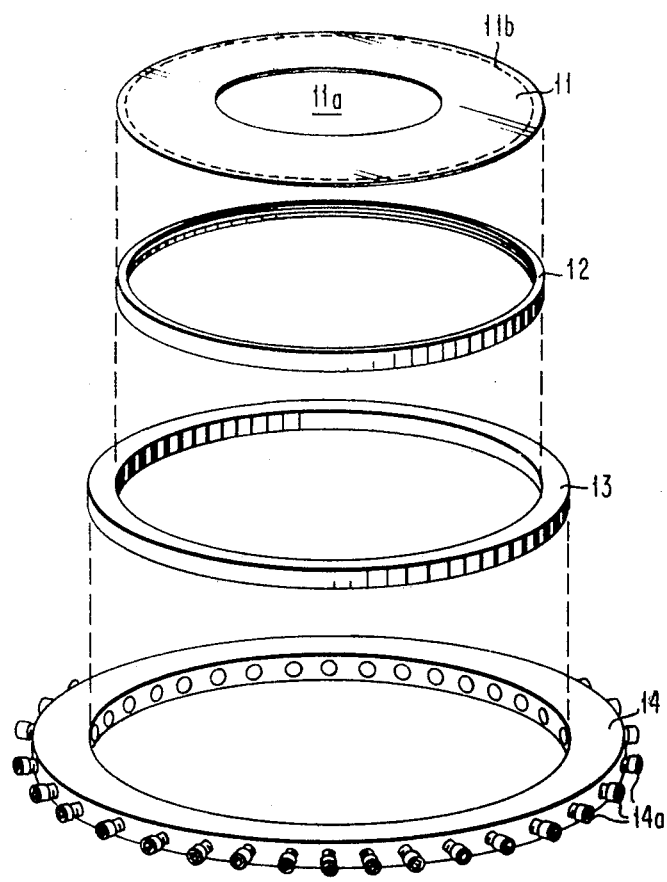
FIG. 1 is an exploded view illustrating the method of fabrication of the recording structure of this invention.

Referring to FIG. 1, there is shown a foil member 11 of a configuration suitable for use in the present invention. Foil 11 is circular in shape and is provided with a central opening 11a. Foil 11 is made of a suitable corrosion-resistant material such as stainless steel, inconel or nitronic foil and preferably has a thickness in the order of 4.0 mils. The material of foil 11 preferably has a yield strength in excess of 100,000 psi. Foil 11 may have applied thereto a magnetic coating prior to being mounted on the ring, or such coating may be applied to the foil after fabrication.

For fabrication, foil 11 is placed on a ring 12 which is radially compressible. Ring 12 is preferably, although not necessarily, made of the same material as foil 11 so as to provide compatibility for welding of the foil to the ring, and common thermal coefficients of expansion, corrosion resistance and high yield and structural strength. Ring 12 is radially compressible by suitable means such as a compression ring 13 inside which ring 12 is adapted to fit and which is compressed by a compression ring 14 which fits around ring 13. Ring 14 may provide compressive force by means of a plurality of screws 14a uniformly spaced around the periphery of ring 14 and threadable through openings therein to provide compressive pressure at a plurality of points on the outside of ring 13. As screws 14a are tightened, the compressive pressure from these screws on ring 13 is transformed into a uniform radial compressive pressure of ring 13 on ring 12, thereby uniformly compressing ring 12. As an alternate to the use of screws 14a, the compressive force may be supplied by means of an eccentric C clamp, hydraulic pressure or other suitable means.

After the desired degree of compression of ring 12 has been produced by tightening of screws 14a, foil 11 is placed on ring 12 and secured thereto by suitable means such as welding, spot welding, laser welding, ultrasonic bonding or fusion, as represented by dashed lines 11b. Preferably, during fastening of foil 11 to ring 12, foil 11 is essentially tension-free.

Screws 14a may then be withdrawn from ring 14 to release the pressure on ring 13 and hence on ring 12. Ring 12 thereupon expands toward its original size, thereby elongating and tensioning foil 11. Preferably, the amount of elastic elongation of foil 11 is sufficient to result in a recording structure having high impact and damage resistance and low microcreep.

In practice, we have employed ring 12 having cross sectional areas between 0.03 and 0.05 in$^2$ for a 14 inch diameter foil of 4 mil thickness. These rings have been compressed in diameter by about 0.2% under a compressive force of approximately 20,000 psi. Upon release of the compressive force, the ring expanded to a diameter which is 0.13% less than its original uncompressed diameter.

If desired, the recording structure formed as described above may be used by arranging to rotate the structure, preferably by driving it by means of ring 12, past an associated transducer mechanism for recording on and reproducing from the magnetic coating on foil 11. Such transducer mechanism may be disposed in the space formed by the opening 11a of foil 11 so as to access the recording surface from the inside diameter of the disk.

Figure 2:
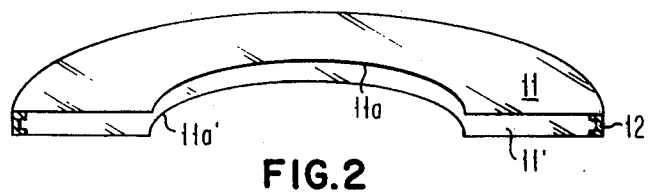
FIG. 2 is a perspective view in cross-section illustrating a recording structure of this invention.

In an alternate embodiment illustrated in FIG. 2, a foil member is provided on both the top and bottom surfaces of ring 12. These foil members, identified in FIG. 2 as 11 and 11', may be mounted on ring 12 as described above, by radially compressing ring 12, securing foil members 11 and 11' thereto at the periphery of the foils, and releasing the compression of ring 12 to tension foil members 11 and 11'. By providing magnetic coatings on both the top and bottom surfaces of foils 11, 11', a total of four recording surfaces are available from the two foil members, and these four surfaces may be accessed by an access mechanism disposed in the space formed by openings 11a, 11'a.

Figure 3:
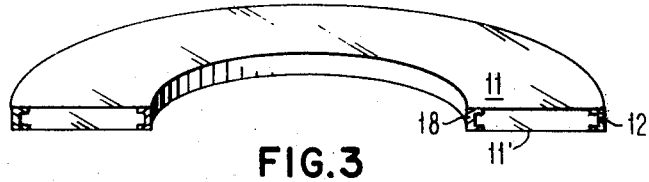
FIG. 3 is a cross-sectional representation of an alternate embodiment of the invention employing rings at both the inner and outer diameters of the foil members.

FIG. 3 illustrates an alternate embodiment of the invention in which both an outside diameter ring 12 is employed, as before, and an inside diameter ring 18 is also used. The structure is fabricated as before by radially compressing ring 12 to the desired extent. Foil members 11, 11' are then secured to the outer edges of both rings 12 and 18 to thus secure the foil members at both their outside and inside diameters. The compression of ring 12 is then released to tension the foil members as before. It will be understood from FIG. 3 that with the use of both inner ring 18 and outer ring 12, only the top surface of foil member 11 and the bottom surface of member 11' will be usable for magnetic recording. The primary purpose of using inner ring 18 is to provide means for clamping the recording structure at the inside diameter.

We claim:

1. A method of fabricating a magnetic recording disk comprising the steps of:

forming a circular foil member of flexible metal, placing a first ring member inside a second ring member, placing said first and second ring members inside a compression ring member, elastically compressing said first and second ring members by the application to said second ring member of compressive force from said compression ring at a plurality of points around the outer periphery of said second ring member, said second ring member transforming said compressive force at said plurality of points into a uniform radial compressive force on said first ring, securing the periphery of said foil member to said elastically compressed first ring member, and releasing the compression on said first and second ring members to permit said first ring member to elastically expand, thereby tensioning said foil member in a uniform manner.

2. A method in accordance with claim 1, including the step of applying a magnetic coating to said foil member prior to securing said foil member to said ring member.

3. A method in accordance with claim 1, including the step of applying a magnetic coating to said foil member after securing said foil member to said ring member.

4. A method in accordance with claim 1, in which said foil member and said ring member are made of similar material.

* * * * *